(12) United States Patent
Sherman et al.

(10) Patent No.: US 9,051,530 B2
(45) Date of Patent: Jun. 9, 2015

(54) FLUID COMPOSITION FOR A VIBRATION DAMPENER

(71) Applicant: BASF SE, Ludwigshafen (DE)

(72) Inventors: John Vincent Sherman, Canton, MI (US); Leslie E. Schmidtke, Grosse Ile, MI (US); Patrice Cusatis, Newburgh, NY (US); Kai Su, Middle Village, NY (US); Paul Leonard Fasano, Carmel, NY (US)

(73) Assignee: BASF SE, Ludwigshafen (DE)

( * ) Notice: Subject to any disclaimer, the term of this patent is extended or adjusted under 35 U.S.C. 154(b) by 105 days.

(21) Appl. No.: 13/849,257

(22) Filed: Mar. 22, 2013

(65) Prior Publication Data

US 2013/0270049 A1    Oct. 17, 2013

Related U.S. Application Data (60) Provisional application No. 61/799,437, filed on Mar. 15, 2013, provisional application No. 61/614,912, filed on Mar. 23, 2012.

(51) Int. Cl.
*C10M 105/14* (2006.01)
*C10M 105/10* (2006.01)
(Continued)

(52) U.S. Cl.
CPC ............ *C10M 169/044* (2013.01); *F16F 9/006* (2013.01); *C08K 5/053* (2013.01);
(Continued)

(58) Field of Classification Search
CPC ............... C10M 169/044; C10M 169/041; C10M 2215/064; C10M 2209/104; C10M 2209/105; C10M 2207/0225; C10M 2223/043; C10M 2209/106; C08K 5/053; F16F 9/006; C10N 2240/08; C10N 2230/06; C10N 2230/02
USPC .................................. 123/1 A; 508/579, 577
See application file for complete search history.

(56) References Cited

U.S. PATENT DOCUMENTS 2,602,780 A   7/1952  Zisman et al.
3,935,116 A   1/1976  Sheratte
(Continued)

FOREIGN PATENT DOCUMENTS

EP    0008131 A1   2/1980
EP    0051195 A1   5/1982
(Continued)

OTHER PUBLICATIONS

Machine-assisted English language translation for WO 91/19913 extracted from the espacenet.com database on Jan. 8, 2014, 20 pages.
(Continued)

*Primary Examiner* — Pamela H Weiss
(74) *Attorney, Agent, or Firm* — Howard & Howard Attorneys PLLC (57) ABSTRACT

A fluid composition comprises a base stock and a polymer. The base stock comprises a glycol, such as ethylene glycol. The polymer comprises the reaction product of a hydroxyl functional initiator, such as a diol, and alkylene oxides. The alkylene oxides are selected from the group of ethylene oxide (EO), propylene oxide (PO), and butylene oxide (BO). In certain embodiments, the alkylene oxides comprise EO and PO. The fluid composition provides a four-ball wear test scar of less than about 1 millimeter, generally under the following test conditions: 60 minutes run, 55° C., 1800 rpm, and 40 kg load. In other embodiments, the fluid composition comprises the polymer and is substantially free of the base stock. The fluid composition is useful for vibration dampening and can be used in vibration dampeners. The vibration dampener is useful for dampening vibrations between the two rigid components of the vehicle.

21 Claims, 1 Drawing Sheet

(51) Int. Cl.
*C10M 107/34* (2006.01)
*C10M 107/04* (2006.01)
*C10M 119/18* (2006.01)
*C10M 169/04* (2006.01)
*F16F 9/00* (2006.01)
*C08K 5/053* (2006.01)

(52) U.S. Cl.
CPC ... *C10M169/041* (2013.01); *C10M 2207/0225* (2013.01); *C10M 2209/104* (2013.01); *C10M 2209/105* (2013.01); *C10M 2209/106* (2013.01); *C10M 2209/107* (2013.01); *C10M 2215/064* (2013.01); *C10M 2223/043* (2013.01); *C10M 2229/02* (2013.01); *C10N 2230/02* (2013.01); *C10N 2230/06* (2013.01); *C10N 2240/08* (2013.01)

(56) References Cited

U.S. PATENT DOCUMENTS

| | | | |
|---|---|---|---|
| 4,001,129 A | 1/1977 | Sheratte | |
| 4,007,123 A | 2/1977 | Sheratte | |
| 5,024,461 A | 6/1991 | Miyakawa et al. | |
| 5,059,339 A | 10/1991 | Suzuki et al. | |
| 6,010,120 A | 1/2000 | Nagasawa | |
| 7,456,138 B2* | 11/2008 | Sherman et al. | 508/579 |
| 7,732,389 B2 | 6/2010 | Sullivan et al. | |
| 7,741,259 B2* | 6/2010 | da Costa | 508/579 |
| 2005/0250654 A1* | 11/2005 | Randles et al. | 508/279 |
| 2005/0256014 A1* | 11/2005 | Sherman et al. | 508/579 |
| 2008/0312113 A1* | 12/2008 | Beatty et al. | 508/162 |
| 2011/0039739 A1* | 2/2011 | Greaves et al. | 508/428 |

FOREIGN PATENT DOCUMENTS

WO    WO 91/19913 A1    12/1991
WO    WO 2005/052407 A1    6/2005

OTHER PUBLICATIONS

English language abstract and machine-assisted English translation for WO 2005/052407 extracted from the espacenet.com database on Jan. 8, 2014, 20 pages.

International Search Report for Application No. PCT/US2013/033572 dated Nov. 29, 2013, 3 pages.

* cited by examiner

FLUID COMPOSITION FOR A VIBRATION DAMPENER

CROSS REFERENCE TO RELATED APPLICATIONS

This application claims the benefit of U.S. Provisional Patent Application Ser. No. 61/614,912, filed on Mar. 23, 2012, and U.S. Provisional Patent Application Ser. No. 61/799,437, filed on Mar. 15, 2013, both of which are incorporated herewith by reference in their entirety.

FIELD OF THE INVENTION

The present invention generally relates to a fluid composition for vibration dampening, and more specifically to a fluid composition comprising a polymer for use in vibration dampeners.

DESCRIPTION OF THE RELATED ART

Vibration dampeners such as mounts and bushings are often used in vehicles to reduce vibrations transferred between two rigid components of vehicles, such as between engines and frames, steering system components (e.g. between control arms), etc. Vibration dampeners typically comprise at least one damping means for supporting loads and damping vibration imparted between the rigid components. The damping means is generally in the form of a flexible body, e.g. a rubber body. Certain vibration dampeners include bodies which define a cavity for retaining a fluid therein. The fluid is useful for damping vibrations, and is generally referred to in the automotive art as damping fluid. Vibration dampeners may suffer from stick-slip conditions, especially in hot climates where high temperatures may cause a lack of lubrication with the damping fluid.

"Stick-slip" (or "slip-stick") is a spontaneous jerking motion that can occur while two objects are sliding over each other. Specifically, it is believed that stick-slip is caused by surfaces alternating between sticking to each other and sliding over each other, with a corresponding change in the force of friction. Typically, the static friction coefficient between two surfaces is larger than the kinetic friction coefficient. If an applied force is large enough to overcome the static friction, then the reduction of the friction to the kinetic friction can cause a sudden jump in the velocity of the movement. In certain vibration dampeners and conditions, the damping fluid is not able to compensate for changes in operational conditions and stick-slip occurs, which can cause undesirable vibrations and noises from the vehicle.

As such, there remains an opportunity to provide improved fluid compositions for use as damping fluids. There also remains an opportunity to provide improved vibration dampeners which contain such fluid compositions.

SUMMARY OF THE INVENTION AND ADVANTAGES

The subject invention provides a fluid composition. The fluid composition is useful for a vibration dampener. In one embodiment, the fluid composition comprises a base stock and a polymer. The base stock comprises a glycol. The polymer comprises the reaction product of an initiator having at least one acidic proton and alkylene oxides reactive with the at least one acidic proton of the initiator. The alkylene oxides are selected from the group of ethylene oxide, propylene oxide, and butylene oxide. The fluid composition provides a four-ball wear test scar of less than about 1 millimeter. In other embodiments of the subject invention, the fluid composition comprises the polymer and is substantially free of the base stock. The subject invention also provides a vibration dampener. The vibration dampener comprises a body that defines a cavity. The invention polymer is disposed in the cavity of the body.

The fluid composition generally provides excellent lubrication within the vibration dampener to decrease or even eliminate stick-slip in the vibration dampener. As such, noise from the vibration dampener or surrounding vehicular components is generally reduced or eliminated during vehicle operation. The fluid composition is useful in hot climates. In addition, the fluid composition also has excellent chemical compatibility with the vibration dampener, such as with the body of the vibration dampener.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

The subject invention provides a fluid composition. The fluid composition is useful for use in a vibration dampener, as described further below. In certain embodiments, the fluid composition, hereinafter simply referred to as "the composition", generally comprises, consists essentially of, or consists of, a base stock and a polymer. In other embodiments, the composition comprises the polymer and is substantially to completely free of the base stock. The composition, in various embodiments, may also include one or more additives as described further below.

The base stock of the composition comprises a glycol. Various types of glycols can be used. Examples of suitable glycols include ethylene glycol, diethylene glycol, propylene glycol, butylene glycol, or combinations thereof. In certain embodiments, the base stock comprises ethylene glycol and propylene glycol. In these embodiments, the ratio of ethylene glycol to propylene glycol can be varied to change viscosity of the base stock, and therefore, the composition. In one embodiment, the base stock is ethylene glycol.

If utilized, the base stock can be present in the composition in various amounts.

Typically, the base stock in present in an amount of at least about 50, at least about 60, at least about 70, at least about 75, or in an amount of from about 50 to about 95, about 60 to about 90, about 70 to about 85, or about 75 to about 85, weight percent (wt. %), each based on 100 parts by weight of the composition, or any range between the lowest and highest of these values. The amount of base stock present in the composition can be varied to change viscosity and viscosity index of the composition. Suitable glycols are commercially available from a variety of suppliers. The composition may include a combination of two or more different base stocks.

In embodiments substantially free of the base stock, the composition generally has less than about 5, less than about 2.5, or less than about 1, wt. % base stock, each based on 100 parts by weight of the composition. In certain embodiments, the composition is completely free of the base stock. In these embodiments, the polymer may be present in the remaining parts by weight. In further embodiments, the polymer makes up a majority of the composition (e.g. if an additive is also used) or an entirety of the composition (e.g. if no additives are used).

The polymer typically comprises the reaction product of an initiator and alkylene oxides. In certain embodiments, the polymer comprises the reaction product of the initiator and at least two different alkylene oxides. The initiator has at least one acidic proton, typically at least two acidic protons. The alkylene oxides are reactive with the acidic proton(s) of the initiator. Examples of suitable initiators include hydroxyl functional initiators and amine functional initiators.

Various types of hydroxyl functional initiators can be used to form the polymer. Examples of suitable hydroxyl functional initiators include monools, diols, triols, tetrols or higher alcohols, which may also be referred to in the art as polyols.

In certain embodiments, the hydroxyl functional initiator is a monool. Examples of suitable monools include n-butanol, iso-butanol, 2-ethyl hexanol, 2-propyl heptanol, butyl glycol, butyl diethyleneglycol, butyl triethyleneglycol, butyl propyleneglycol, butyl dipropyleneglycol, butyl tripropyleneglycol, methyl diglycol, methyl triglycol, methyldipropyleneglycol, methyldipropyleneglycol, methanol, ethanol, hexanol, iso-nonanol, decanol, 2-butyloctanol, oleyl alcohol, octadecanol (e.g. stearyl alcohol), and isononadecanol.

In other embodiments, the hydroxyl functional initiator is a diol. Examples of suitable diols include ethyleneglycol, 1,2-propyleneglycol, 1,2-hexanediol, diethyleneglycol, triethyleneglycol, dipropyleneglycol, and tripropyleneglycol. In yet other embodiments, the hydroxyl functional initiator is a polyol. Examples of suitable polyols include glycerol, trimethylolpropane, and pentaerithritol.

Various types of amine functional initiators can be used to form the polymer. Examples of suitable amine functional initiators include monoamines, diamines, triamines or higher amines, which may also be referred to in the art as polyamines. Specific examples of suitable amine functional initiators include alkanolamines, ethylene diamines, and diethylene triamines.

Various types of alkylene oxides can be used to form the polymer. In certain embodiments, the alkylene oxides are selected from the group of ethylene oxide (EO), propylene oxide (PO), and butylene oxide (BO). In further embodiments, the alkylene oxides comprise EO and PO. In these embodiments, the EO and PO can be in various ratios. Typically, the polymer has an EO:PO ratio of from about 90:10 to about 10:90, about 25:75 to about 75:25, about 25:75 to about 85:15, about 50:50 to about 85:15, about 55:45 to about 80:20, or about 60:40 to about 75:25, or any range between the lowest and highest of these values. In one embodiment, the polymer has an EO:PO ratio of about 60:40. In another embodiment, the polymer has an EO:PO ratio of about 75:25. Presence of EO and PO is useful for compatibility of the polymer with the vibration dampener, as described below.

The alkylene oxides of the polymer may be the same as or different from one another, i.e., random or block, such that the polymer may also be referred to in the art as a homopolymer, a random copolymer, or a block copolymer. Examples of homopolymers include all EO or all PO homopolymers, whereas examples of random or block copolymers include the EO:PO copolymers described above. In certain embodiments, the polymer comprises a blend of glycols, such as the glycols described above for the base stock. The polymer may also be referred to in the art as a polyalkylene glycol (PAG) or a polyglycol.

The polymer can be present in the composition in various amounts. Typically, in embodiments also utilizing the base stock, the polymer is present in an amount of from about 5 to about 25, about 7.5 to about 22.5, about 10 to about 20, or about 15 to about 20, wt. %, each based on 100 parts by weight of the composition, or any range between the lowest and highest of these values. In other embodiments, the polymer is present in an amount of from about 75 to about 100, about 80 to about 99.9, about 85 to about 99.5, about 90 to about 99.5, or about 95 to about 99, wt. %, each based on 100 parts by weight of the composition, or any range between the lowest and highest of these values. In some of these embodiments, the composition is free of the base stock. Specific examples of suitable polymers are available from BASF Corporation of Florham Park, N.J., under the trade name of PLURASAFE®, such as PLURASAFE® WS D 60-46 and PLURASAFE® WS-55, and under the trade name of PLURIOL®, such as PLURIOL® WT 1400. The composition may include a combination of two or more different polymers.

In certain embodiments, the polymer is EO capped. In other embodiments, the polymer is PO capped. Such capping may be referred to as a small block, e.g. a small block of EO which acts as the cap. If the polymer is capped, it may be referred to in the art as a block copolymer. In certain embodiments, the polymer is a block PAG. Such block PAGs can comprise blocks of all EO or PO, blocks of random EO/PO monomers with at least two blocks being of different EO/PO ratios, or a combination of all EO or PO blocks and random EO/PO blocks.

Typically, the polymer has a plurality of hydroxyl groups. In certain embodiments, the polymer has at least two hydroxyl groups per molecule. The number of hydroxyl groups can be imparted to the polymer by the number of acidic hydrogen atoms originally present on the initiator.

The polymer can be of various viscosity indices. In various embodiments, the polymer has a viscosity index (VI) of from about 50 to about 500, about 100 to about 400, about 120 to about 225, about 150 to about 200, about 160 to about 180, or about 180, or any range between the lowest and highest of these values. In certain embodiments, the polymer has a VI of about 100. In other embodiments, the polymer has a VI of about 180. The VI of the polymer can be determined by various methods, such as by ASTM D 2270-10e1.

The polymer can be of various viscosities. In various embodiments, the polymer has a kinematic viscosity of from about 5 to about 100,000, about 5 to about 70,000, about 5 to about 50,000, about 5 to about 10,000, about 5 to about 1,000, about 5 to about 500, about 5 to about 100, about 5 to about 75, about 10 to about 75, about 25 to about 50, about 40 to about 50, about 42.5 to about 50, about 45 to about 50, or about 45 to about 47.5, centistokes (cSt) at 40° C., or any range between the lowest and highest of these values. Viscosity of the polymer can be determined by various methods, such as by ASTM D 445-11a.

The polymer can be of various molecular weights. Typically, the polymer has a number average molecular weight (Mn) of from about 200 to about 20,000, about 250 to about 4,500, or about 400 to about 1,200, or any range between the lowest and highest of these values. The Mn of the polymer can be determined by various methods in the polymeric art.

In certain embodiments, the composition further comprises one or more additives. Various types of additives can be used. Examples of suitable additives include corrosion inhibitors, metal pas sivators, defoamers, antioxidants, antiwear additives, dispersants, stabilizers, and combinations thereof. If utilized, the additive(s) may be used in various amounts.

For example, the additive(s) can be present in an amount of from 0 to about 5, about 0.0005 to about 5, or about 0.0005 to about 2.5, total wt. %, each based on 100 parts by weight of the composition, or any range between the lowest and highest of these values.

Examples of suitable corrosion inhibitors include organic acids and esters thereof, such as nitrogen-, phosphorous-, and sulfur containing compounds, succinic acid derivatives, 4-nonylphenoxyacetic acid and alkyl alkanolamines, e.g. methyldiethanolamine (MDEA). If utilized, the corrosion inhibitor is typically present in an amount of from about 0.01 to about 1, about 0.25 to about 0.75, or about 0.5, wt. %, each based on 100 parts by weight of the composition, or any range between the lowest and highest of these values. Examples of suitable metal passivators include tolyltriazole, benzothiazole and benzotriazole. Such metal passivators can be used in various amounts, such as those amounts described above for the corrosion inhibitor.

Examples of suitable defoamers include silicone based defoamers and nonionic block copolymers. If utilized, the defoamer is typically present in an amount of from about 0.0005 to about 1, about 0.001 to about 0.005, or about 0.001 to about 0.05, wt. %, each based on 100 parts by weight of the composition, or any range between the lowest and highest of these values. Specific examples of suitable defoamers are commercially available from Dow Corning Corporation of Midland, Mich., under the trade name ANTIFOAM, such as ANTIFOAM 1430. Other specific examples include those commercially available from a variety of suppliers under the trade name FOAM BAN, such as FOAM BAN 149.

Examples of suitable antioxidants include dialkylthiopropionates, organic amines and hindered phenols e.g. dilaurylthiopropionate, dioctyldiphenylamine, phenylnaphthylamine, phenothiazine and butylated hydroxytoluene. Specific examples of suitable antioxidants are commercially available from BASF under the trade name IRGANOX®, such as IRGANOX® L-57 and IRGANOX® L 101. If utilized, the antioxidant is typically present in an amount of from about 0.01 to about 1, about 0.1 to about 0.75, about 0.1 to about 0.5, or about 0.1 to about 0.25, wt. %, each based on 100 parts by weight of the composition, or any range between the lowest and highest of these values.

Examples of suitable antiwear additives include dithiophosphates, amine phosphates, phosphorothionates, carbamates, and alkyl and aryl phosphates. Specific examples of suitable antiwear additives are commercially available from BASF under the trade name IRGALUBE®, such as IRGALUBE® 349 and IRGALUBE® TPPT. If utilized, the antiwear additive is typically present in an amount of from about 0.01 to about 1, about 0.1 to about 0.75, about 0.1 to about 0.5, or about 0.1 to about 0.25, wt. %, each based on 100 parts by weight of the composition, or any range between the lowest and highest of these values.

Typically, the composition is substantially free of water. As such, the composition generally has less than about 5, less than about 2.5, or less than about 1, wt. % water, each based on 100 parts by weight of the composition. In certain embodiments, the composition is completely free of water. While water may not be purposefully added to the composition, the composition may include some amount of water which is absorbed from the ambient environment. For example, the base stock may be hygroscopic such that it absorbs a certain amount of moisture from the ambient environment, e.g. during storage of the composition over time.

The composition can have various viscosity indices. In certain embodiments, the composition has a VI of at least about −50 (minus/negative 50), at least about −10 (minus/negative 10), at least about 0, at least about 50, at least about 100, at least about 125, at least about 150, or a VI of from about −50 to about 200, about −20 (minus/negative 20) to about 150, or about −10 (minus/negative 10) to about 110, or any range between the lowest and highest of these values. The viscosity index can be varied by changing the type and or amount of the base stock and/or polymer. In other embodiments, the composition may have a VI that is higher or lower than the aforementioned values.

The composition generally has excellent antiwear properties. It is believed that these antiwear properties correspond, in part, to preventing stick-slip conditions (e.g. in vibration dampeners containing the invention composition). These antiwear properties can be determined and represented by a four-ball wear test. As understood in the art, such tests can be used to determine the relative wear preventive properties of lubricating fluids in sliding contact under proscribed test conditions.

An example of a suitable test standard for characterizing antiwear properties of the invention composition is ASTM D4172. Other standardized tests which utilize a four-ball methodology (or a four-ball wear test machine) include: ASTM D2266, for wear preventive characteristics of lubricating grease; ASTM D2596, for measurement of extreme-pressure properties of lubricating greases; and ASTM D5183, for determination of the coefficient of friction of lubricants. One or more of these latter three tests may also be utilized to characterize physical properties of various embodiments of the invention composition, in addition or alternate to, ASTM D4172.

In a four-ball wear test, three fixed steel balls are typically put into contact with a fourth ball in rotating contact at preset test conditions. All of the balls are placed in a bath of (or submerged in) the respective lubricant to be analyzed, e.g. the invention composition. As understood in the art, the wear protection properties of a lubricant are measured by comparing the average wear scars on the three fixed balls. The scar is imparted by metal on metal contact imparted by the fourth rotating steel ball contacting the three fixed steel balls. In general, the smaller the average wear scar, the better (or the greater) the protection that is imparted/provided by the respective lubricant.

In various embodiments, the invention composition has an average wear scar (or "diameter" or "value") of less than about 1, less than about 0.95, less than about 0.90, less than about 0.85, less than about 0.80, less than about 0.75, less than about 0.70, less than about 0.65, less than about 0.60, less than about 0.55, less than about 0.50, less than about 0.45, less than about 0.40, less than about 0.35, less than about 0.30, less than about 0.25, or of from about 0.25 to about 1, about 0.25 to about 0.95, about 0.30 to about 0.90, about 0.35 to about 0.90, about 0.40 to about 0.90, about 0.45 to about 0.85, about 0.50 to about 0.85, about 0.55 to about 0.85, about 0.60 to about 0.85, about 0.65 to about 0.85, or about 0.50, about 0.55, about 0.60, 0.65, about 0.70, about 0.75, about 0.80, about 0.85, about 0.90, or about 0.95, millimeter(s), or any range between the highest and lower of these values. The wear scar may be alternatively described as any value, range, or subrange of values, both whole and fractional, within or between any one or more values described immediately above. In various embodiments, the aforementioned wear scar values may vary by ±1, 2, 3, 4, 5, 6, 7, 8, 9, or 10, %.

The aforementioned average wear scar diameter is typically determined according to ASTM D4172, utilizing 40 kg pressure at about 130° F. (or about 55° C.), 1800 rpm for 60 minutes (1 hour) duration. Other ASTM tests may also be utilized. The full disclosures of the ASTM tests described herein are incorporated by reference in their entirety.

The composition can have various viscosities. Typically, the composition has a kinematic viscosity of no greater than about 30, no greater than about 25, no greater than about 20, no greater than about 17.5, no greater than about 15, or from about 6 to about 16, about 8 to about 14, or about 9 to about 11, cSt at 40° C., or any range between the lowest and highest of these values. The viscosity index can be varied by changing the type and or amount of the base stock and/or polymer.

The composition can be formed by various methods. For example, the composition can be formed by providing the base stock, the polymer, and optionally, one of more of the additives. A certain amount of the polymer can be blended with the base stock until a desired viscosity is reached, or vice versa. The additive(s), if utilized, can then be added to further form the composition. In embodiments just having the polymer, the additive(s) can simply be added to the polymer or vice versa to form the composition. The composition is not limited to any particular method of manufacture.

As introduced above, the invention composition is useful for, as, or in, a vibration dampener. The present invention also provides a vibration dampener. The vibration dampener is typically adapted for a vehicle, such as for a car, truck, SUV, etc. The vibration dampener is not limited to any particular use. The vibration dampener contains the invention composition. As such, the composition may also be referred to in the art as a damping liquid or damping fluid.

The vibration dampener is useful for dampening vibrations between two rigid components of the vehicle. For example, the vibration dampener can be used between the engine and frame (or chassis) of a vehicle, between the frame and body of a vehicle, in the suspension system of a vehicle, in the steering system of a vehicle, etc. Examples of vibration dampeners include vibration damping mounts and vibration damping bushings, which may also be referred to in the automotive art as hydraulic mounts and hydraulic bushings.

The vibration dampener can be adapted for use in various locations of the vehicle, and specific examples of locations and corresponding types of vibration dampeners are as follows. Vehicle power train: roll restrictors; engine mounts, including longitudinal and pendulum suspension types; and transmission mounts, including longitudinal and pendulum suspension types. Vehicle front drive train: front lower control arm bushings, including front and rear; anti-roll bar bushings; spring seats; rebound bumpers; cradle mounts; and strut mounts. Vehicle rear drive train: flexible axle bushings; multi-link restrictors; spring isolators and shock absorbers; cradle blocks; shock isolators; control arm bushings; differential bushings; and anti-roll bar bushings. Vehicle chassis: front and rear body mounts. Vehicle mass dampers: strut tower mass dampers; cross member mass dampers; rear cross member mass dampers; and transmission mass dampers. The invention composition can be disposed in these and other types of vibration dampeners. The composition can be used in the vibration dampener in various amounts, depending, for example, on the particular use, size, and configuration of the vibration dampener. The present invention is not limited to any particular type of vibration dampener.

The vibration dampener generally comprises a body adapted for disposition between the two rigid components of the vehicle. As such, the body can be of various configurations and dimensions. The body is not limited to any particular adaptation. The body generally defines a cavity. The body is typically flexible to allow for movement of the vibration dampener. The composition is disposed within the cavity of the body. In certain embodiments, the polymer is disposed in the cavity. In further embodiments, the base stock and/or one or more additives is also disposed in the cavity along with the polymer. In specific embodiments, the cavity is free of the base stock, such that only the polymer, and optionally, one or more additives is/are present. The cavity is generally sealed to retain the composition in the body of the vibration dampener.

The body is generally formed from a flexible material. Various types of materials can be used to form the body, such as rubbers, plastics, etc. The body is not limited to any particular type of material. Examples of suitable materials for forming the body include nylon, polyurethane (e.g. TPU), natural rubber, or a natural rubber-based material composed of natural rubber and synthetic rubber such as styrene-butadiene rubber (SBR) or the like.

In certain embodiments, the body of the vibration dampener includes a combination of flexible and rigid materials, such as rubber and metal (e.g. steel). An adhesive may be used to connect the two materials. The composition typically has excellent chemical compatibility with such materials.

The invention composition generally serves as a primary component in the function of the vibration dampener to minimize vibration and also as a lubricant and in that capacity reduces or eliminates stick-slip within the vibration dampener. As such, undesirable noise from the vibration dampener is generally reduced or eliminated. The composition provides excellent results even in hot climates relative to conventional compositions which suffer from various issues when subjected to higher temperatures. For example, conventional compositions are prone to reduced viscosities (or "thinning") at higher temperatures which reduce or completely negate their lubricity. The invention composition also generally has excellent lubrication, antiwear, and non-compressibility properties.

The following examples, illustrating the compositions of the present invention, are intended to illustrate and not to limit the invention.

EXAMPLES

Various invention and comparative compositions are prepared and tested. The amounts of each component illustrated in Tables I, II, and III below are in weight percent (wt. %) based on 100 parts by weight of the respective composition unless otherwise indicated.

The compositions are made by providing the base stock(s) and mixing them with the polymer(s) until a homogenous mixture is obtained. The additive component(s) is then added to the mixture to form the respective composition. In examples not having the base stock(s), the additives are simply added to the polymer(s) to form the respective composition. Kinematic viscosity is determined according to ASTM D 445-11a. Viscosity index is determined according to ASTM D 2270-10e1. Antiwear is determined via a four-ball wear test according to ASTM D4172, utilizing 40 kg load at 55° C. (~130° F.), 1800 rpm, and a 1 hour (60 minutes) duration. A "-" symbol, by itself, generally indicates that the number was not determined or available at the time. Four-ball testing and Ball-on-disk (MTM) traction testing are also completed to illustrate differences in frictional properties. The four-ball test result is a wear scar created under specified test conditions in a vessel container holding a test fluid. The MTM (ball-on-disk, a.k.a. mini-traction machine) measures traction forces between two metal specimens when submerged in the test fluid. Examples of MTM testing methodologies, e.g. ASTM tests, are described in U.S. Pat. No. 7,732,389 to Sullivan et al. Fall-ball wear parameters: 130° F. (~55° C.), 1800 rpm, 40 kg load, 60 minutes (1 hours). MTM conditions: Step 20 (last measurement interval), 55° C. (~130° F.), 35 N, SRR (slide/roll ratio)=50%.

TABLE I

| Component (wt. %) | Example No. | | | | | | |
|---|---|---|---|---|---|---|---|
| | 1 | 2 | 3 | 4 | 5 | 6 | 7 |
| Base Stock 1 | 79.6 | 74.6 | 76.1 | 80.4 | 81.6 | 79.6 | 0 |
| Base Stock 2 | 0 | 0 | 13.4 | 4.2 | 0 | 0 | 0 |
| Polymer 1 | 19.9 | 24.9 | 10.0 | 14.9 | 17.9 | 0 | 0 |
| Polymer 2 | 0 | 0 | 0 | 0 | 0 | 19.9 | 0 |
| Polymer 3 | 0 | 0 | 0 | 0 | 0 | 0 | 99.05 |
| Corrosion Inhibitor | 0.50 | 0.50 | 0.50 | 0.50 | 0.50 | 0.50 | 0.50 |
| Defoamer 1 | 0.001 | 0.001 | 0.001 | 0.001 | 0.001 | 0.001 | 0 |
| Defoamer 2 | 0 | 0 | 0 | 0 | 0 | 0 | 0.05 |
| Antioxidant | 0 | 0 | 0 | 0 | 0 | 0 | 0.2 |
| Antiwear Additive | 0 | 0 | 0 | 0 | 0 | 0 | 0.2 |
| Total Parts Weight | 100 | 100 | 100 | 100 | 100 | 100 | 100 |
| Kinematic Viscosity at 40° C. (cSt) | 14.8 | 16.6 | 13.1 | 13.5 | 13.9 | 26.1 | ~9 |
| Viscosity Index | — | — | — | — | −8.8 | — | 100 |

TABLE II

| Component (wt. %) | Example No. | | | | | | |
|---|---|---|---|---|---|---|---|
| | 8 | 9 | 10 | 11 | 12 | 13 | 14 |
| Base Stock 1 | 63.0 | 56.0 | 79.5 | 74.5 | 85.5 | 79.5 | 76.5 |
| Base Stock 2 | 27.0 | 24.0 | 0 | 0 | 0 | 0 | 0 |
| Polymer 1 | 0 | 0 | 0 | 0 | 0 | 0 | 0 |
| Polymer 2 | 0 | 0 | 20 | 25 | 10 | 15 | 18 |
| Polymer 3 | 9.05 | 19.05 | 0 | 0 | 0 | 0 | 0 |
| Corrosion Inhibitor | 0.50 | 0.50 | 0.50 | 0.50 | 0.50 | 0.50 | 0.50 |
| Defoamer 1 | 0 | 0 | 0.001 | 0.001 | 0.001 | 0.001 | 0.001 |
| Defoamer 2 | 0.05 | 0.05 | 0 | 0 | 0 | 0 | 0 |
| Antioxidant | 0.20 | 0.20 | 0 | 0 | 0 | 0 | 0 |
| Antiwear Additive | 0.20 | 0.20 | 0 | 0 | 0 | 0 | 0 |
| Total Parts Weight | 100 | 100 | 100 | 100 | 100 | 100 | 100 |
| Kinematic Viscosity at 40° C. (cSt) | — | — | — | — | — | — | — |
| Viscosity Index | — | — | — | — | — | — | — |

TABLE III

| Component (wt. %) | Example No. | | | | |
|---|---|---|---|---|---|
| | 15 | 16 | 17 | 18 | 19 |
| Base Stock 1 | 79.5 | 84.5 | 70.0 | 100 | 0 |
| Base Stock 2 | 0 | 0 | 30.0 | 0 | 100 |
| Polymer 1 | 0 | 0 | 0 | 0 | 0 |
| Polymer 2 | 20.0 | 15.0 | 0 | 0 | 0 |
| Polymer 3 | 0 | 0 | 0 | 0 | 0 |
| Corrosion Inhibitor | 0 | 0 | 0.50 | 0.50 | 0.50 |
| Defoamer 1 | 0 | 0 | 0.001 | 0.001 | 0.001 |
| Defoamer 2 | 0 | 0 | 0 | 0 | 0 |
| Antioxidant | 0 | 0 | 0 | 0 | 0 |
| Antiwear Additive | 0 | 0 | 0 | 0 | 0 |
| Total Parts Weight | ~100 | ~100 | ~100 | ~100 | ~100 |
| Kinematic Viscosity at 40° C. (cSt) | — | — | ~10.5 | ~8 | ~17 |
| Viscosity Index | — | — | −141 | — | — |

Base Stock 1 is ethylene glycol.

Base Stock 2 is propylene glycol.

Polymer 1 is a ethylene glycol, propylene glycol initiated polyalkylene glycol having an EO:PO ratio of about 60:40, a VI of about 180, a number average molecular weight (Mn) of from about 520 to about 600, or about 560, and a kinematic viscosity of about 46 centistokes (cSt) at 40° C., available from BASF.

Polymer 2 is a diethylene glycol, dipropylene glycol initiated polyalkylene glycol having an EO:PO ratio of about 75:25, a VI of about 230, a Mn of from about 1900 to about 2900, or about 2400, and a kinematic viscosity of from about 260 to about 300 cSt at 40° C., available from BASF.

Polymer 3 is an n-butanol initiated polyalkylene glycol having an EO:PO ratio of about 50:50, a Mn of from about 250 to about 320, or about 300, and a kinematic viscosity of from about 7 to about 11 cSt at 40° C., available from BASF.

Corrosion Inhibitor is methyldiethanolamine (MDEA).

Defoamer 1 is a silicone based defoamer, commercially available from Dow Corning.

Defoamer 2 is another silicone based defoamer.

Antioxidant is an alkylated diphenyl amine antioxidant, commercially available from BASF.

Antiwear Additive is a mixture of amine phosphates, commercially available from BASF.

Examples 1 through 16 generally represent invention examples and examples 17 through 19 generally represent comparative examples. Further, examples 11, 12, 14-16, and 19 are prophetic examples. Each of the example compositions is disposed in a vibration dampener to determine their lubricity properties under various loads and at various temperatures. The loads and temperatures are used to simulate conditions encountered in the real world, such as hot climates near the equator, e.g. in South America, the Middle East, etc. These loads include 20 N and 100 N, and the temperatures include room temperature (RT; ~23° C.), 49° C., 80° C., and 90° C. Various vibration inputs are applied to the vibration dampeners to simulate real world conditions. These inputs include random and 0.5 Hz sine wave inputs.

The vibration dampener having composition 17 has undesirable noise issues at various temperatures under 100 N load, which indicates stick-slip is occurring within the vibration dampener.

Compositions 1 through 16 generally provide excellent results, with compositions 1 through 7, and even more so composition 5, providing excellent results across many loads and temperatures. Such results are based on little to no noise emanating from the vibration dampeners over a majority of the test loads and temperatures.

Some examples of the vibration testing and resulting noise results are illustrated in Table IV below. Generally, results greater than 2.5 sones are deemed as objectionable (i.e., noisy). These results are indicated by an "X" symbol. Results from 1 to 2.5 sones are deemed barely audible and therefore not objectionable. These results are indicated by a "Δ" symbol. Results less than 1 sone are not audible and therefore also not objectionable. These results are indicated by an "O" symbol. As introduced above, results that were not obtained or measured are indicated by a "-" symbol in Table IV below.

Results for some of these additional examples are illustrated in Table V below.

TABLE V

|  | Example A-1 | Example A-2 | Example B |
|---|---|---|---|
| Kinematic Viscosity at 40° C.; mm²/sec; ASTM D 445 | 13.4 | 13.55 | 11.62 |
| Kinematic Viscosity at 100° C.; mm²/sec; ASTM D 445 | 2.72 | 2.79 | 2.16 |
| Pour Point; ° C.; D 97 | −39 | −36 | −78 |
| Viscosity Index | 9 | — | −141** |
| Four-ball Wear; 130° F. (55° C.), 1800 rpm, 40 kg load, 60 minutes; mm | 0.82* | 0.66 | 1.86* |

*Average of two runs.
**Outside testing parameters.

Examples A-1 and A-2 generally represent invention examples, and Example B generally represents a comparative example. The compositions of Examples A-1 and A-2 are essentially the same as Example 5 described above. These examples show an excellent combination of desirable physical properties, including a four-ball wear scar of less than 1 mm. The composition of Example B is essentially the same as Example 17 described above. This example shows poor

TABLE IV

| Example No. | Preload (N) | Random Input RT* | Random Input 49° C. | 0.5 Hz Sine Wave Input RT* | 0.5 Hz Sine Wave Input 49° C. | 0.5 Hz Sine Wave Input 80° C. | 0.5 Hz Sine Wave Input 90° C. | Random Input 80° C. | Random Input 90° C. |
|---|---|---|---|---|---|---|---|---|---|
| 17 | 100 | — | — | X | — | — | — | — | — |
| 7 | 100 | — | — | O | O | — | — | — | — |
| 7 | 100 | — | — | O | O | — | — | — | — |
| 7 | 100 | — | — | O | Δ | — | — | — | — |
| 17 | 100 | X | X | X | X | — | — | — | — |
| 8 | 100 | Δ | Δ | O | O | — | — | — | — |
| 9 | 100 | Δ | O | O | O | — | — | — | — |
| 19 | 100 | O | X | O | X | — | — | — | — |
| 19 | 20 | O | X | O | X | — | — | — | — |
| 1 | 100 | O | Δ | O | Δ | X | — | Δ | — |
| 1 | 20 | O | O | O | Δ | X | — | Δ | — |
| 2 | 100 | O | Δ | O | Δ | Δ | — | Δ | — |
| 2 | 20 | O | Δ | O | O | X | — | Δ | — |
| 3 | 100 | O | X | Δ | X | — | — | — | — |
| 3 | 20 | O | X | O | X | — | — | — | — |
| 44 | 100 | O | X | O | X | — | — | — | — |
| 4 | 20 | O | X | O | X | — | — | — | — |
| 5 | 100 | Δ | — | Δ | — | Δ | O | O | Δ |
| 5 | 20 | O | — | Δ | — | O | X | Δ | X |
| 15 | 100 | Δ | — | O | — | O | — | O | — |
| 15 | 20 | O | — | O | — | Δ | — | O | — |
| 16 | 100 | O | — | O | — | Δ | — | O | — |
| 16 | 20 | O | — | O | — | O | — | O | — |

*"RT" is room temperature, i.e., ~23° C.

Additional examples of some of the aforementioned compositions are retested and/or confirmed. For example, some of the compositions are re-made, in duplicate, to confirm consistency between different batches of the same. These Examples include Examples A and B, where a numerical designation generally indicates the same composition, but a different run or batch. For example, A-1 and A-2 are batches of A, B-1 and B-2 are batches of B, etc.

physical properties, such as a four-ball wear scar much greater than 1 mm (which is undesirable).

Figure 1:
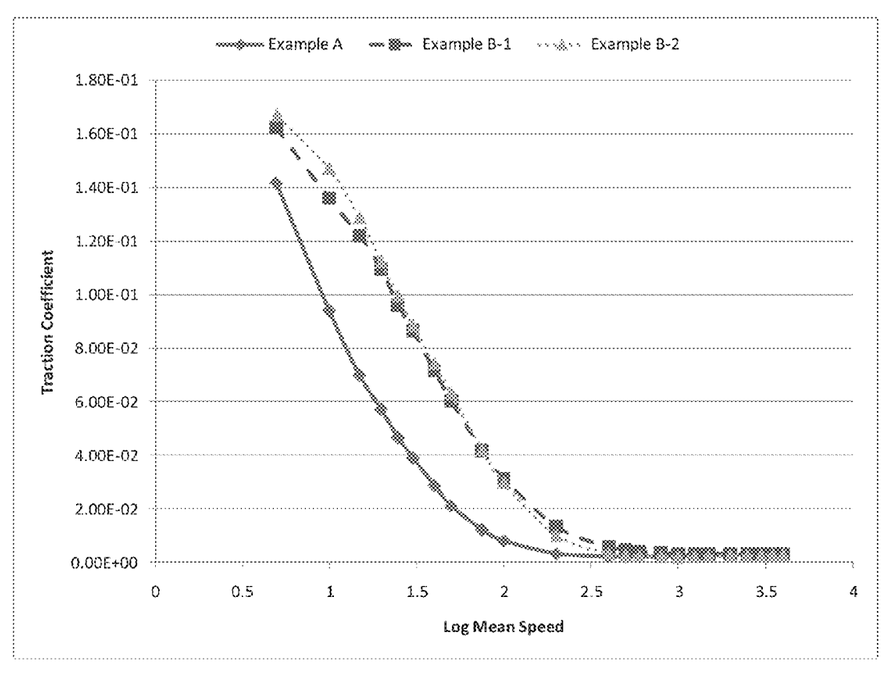
FIG. 1 is a plot illustrating three traction coefficient measurements over a range of specimen speeds for various examples of fluid composition.

Referring now to FIG. 1, FIG. 1 provides a visible representation of the traction coefficient measurements over a range of specimen speeds. Example A generally represents an invention example, and Examples B-1 and B-2 generally represent comparative examples. The composition of Example A is essentially the same as Example 5 described above. This example shows a lower traction coefficient, which indicates improved durability and less energy loss (which is desirable). The compositions of Examples B-1 and B-2 are essentially the same as Example 17 described above. These examples have a higher traction coefficient, which indicates reduced durability and greater energy loss (which is undesirable).

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A fluid composition for a vibration dampener, said composition comprising:
    a base stock comprising a glycol selected from ethylene glycol, diethylene glycol, propylene glycol, butylene glycol, and any combination thereof; and
    a polymer comprising the reaction product of;
        an initiator having at least one acidic proton, and
        alkylene oxides reactive with said at least one acidic proton of said initiator and selected from the group of ethylene oxide, propylene oxide, and butylene oxide;
    wherein said composition provides a four-ball wear test scar of less than about 1 millimeter.

2. The composition as set forth in claim 1 having a kinematic viscosity of no greater than about 30 centistokes (cSt) at 40° C.

3. The composition as set forth in claim 1 wherein said base stock is present in an amount of at least about 50 weight percent (wt. %) based on 100 parts by weight of said composition.

4. The composition as set forth in claim 1 wherein said base stock comprises ethylene glycol and/or propylene glycol.

5. The composition as set forth in claim 1 wherein said base stock comprises ethylene glycol or propylene glycol.

6. The composition as set forth in claim 1 wherein said polymer is present in an amount of from about 5 to about 25 wt. % based on 100 parts by weight of said composition.

7. The composition as set forth in claim 1 wherein said alkylene oxides are at least two different alkylene oxides and are ethylene oxide (EO) and propylene oxide (PO).

8. The composition as set forth in claim 7 wherein said polymer has an EO:PO ratio of from about 25:75 to about 85:15.

9. The composition as set forth in claim 8 wherein said polymer has an EO:PO ratio of from about 60:40 to about 75:25.

10. The composition as set forth in claim 1 wherein said initiator is a hydroxyl functional initiator.

11. The composition as set forth in claim 1 wherein said polymer has a kinematic viscosity of from about 40 to about 50 centistokes (cSt) at 40° C.

12. The composition as set forth in claim 1 further comprising at least one additive selected from the group of a defoamer, a corrosion inhibitor, or a combination thereof.

13. The composition as set forth in claim 12 wherein said additive is present in an amount of from about 0.0005 to about 5 wt. % based on 100 parts by weight of said composition.

14. The composition as set forth in claim 1 providing a four-ball wear test scar of less than about 0.9 millimeters.

15. The composition as set forth in claim 1 having a kinematic viscosity of from about 6 to about 16 centistokes (cSt) at 40° C.

16. A fluid composition for a vibration dampener, said composition comprising:
    at least about 50 weight percent (wt. %) of a base stock comprising a glycol selected from ethylene glycol, diethylene glycol, propylene glycol, butylene glycol, and any combination thereof;
    about 5 to about 25 wt. % of a polymer comprising the reaction product of;
        a hydroxyl functional initiator, and
        at least two different alkylene oxides reactive with said hydroxyl functional initiator and selected from the group of ethylene oxide, propylene oxide, and butylene oxide; and 0 to about 5 wt. % of an additive selected from the group of a defoamer, a corrosion inhibitor, or a combination thereof;

wherein each wt. % is based on 100 parts by weight of said composition; and wherein said composition provides a four-ball wear test scar of less than about 1 millimeter and has a kinematic viscosity of from about 6 to about 16 centistokes (cSt) at 40° C.

17. The composition as set forth in claim 16 wherein said glycol comprises ethylene glycol, said hydroxyl functional initiator comprises a diol, said at least two different alkylene oxides are ethylene oxide (EO) and propylene oxide (PO), and said polymer has an EO:PO ratio of from about 60:40 to about 75:25.

18. A vibration dampener for a vehicle containing the composition as set forth in claim 1.

19. A vibration dampener for a vehicle, said vibration dampener comprising:
   a body defining a cavity; and
   a polymer disposed in said cavity;
   wherein said polymer comprises the reaction product of;
      an initiator having at least one acidic proton, and
      alkylene oxides reactive with said at least one acidic proton of said initiator and selected from the group of ethylene oxide, propylene oxide, and butylene oxide and further comprising a base stock also disposed in said cavity along with said polymer, wherein said base stock comprises a glycol selected from ethylene glycol, diethylene glycol, propylene glycol, butylene glycol and any combination thereof.

20. The vibration dampener as set forth in claim 19 further comprising at least one additive also disposed in said cavity along with said polymer, wherein said at least one additive is selected from the group of a defoamer, a corrosion inhibitor, or a combination thereof.

21. The vibration dampener as set forth in claim 19 wherein said composition provides a four-ball wear test scar of less than about 1 millimeter and/or has a kinematic viscosity of no greater than about 30 centistokes (cSt) at 40° C.

* * * * *